Sept. 12, 1944.   G. W. GOLDNER   2,357,887
ELECTRICAL SURGE DEVICE
Filed Feb. 3, 1941

INVENTOR:
GEORGE W. GOLDNER,
By Em Harrington
ATTORNEY.

Patented Sept. 12, 1944

2,357,887

UNITED STATES PATENT OFFICE 2,357,887

ELECTRICAL SURGE DEVICE

George W. Goldner, Clayton, Mo., assignor to James R. Kearney Corporation, St. Louis, Mo., a corporation of Missouri Application February 3, 1941, Serial No. 377,124

2 Claims. (Cl. 175—30)

This invention relates generally to electrical surge devices and more specifically to such devices adapted for use in by-passing surges due to lightning and other causes and for interrupting power-follow currents which usually accompany such surges, the predominant object of the invention being to provide an electrical surge device of this type which is of such improved construction and arrangement that it is capable of performing its intended function in an improved and highly efficient manner.

Figure 1:
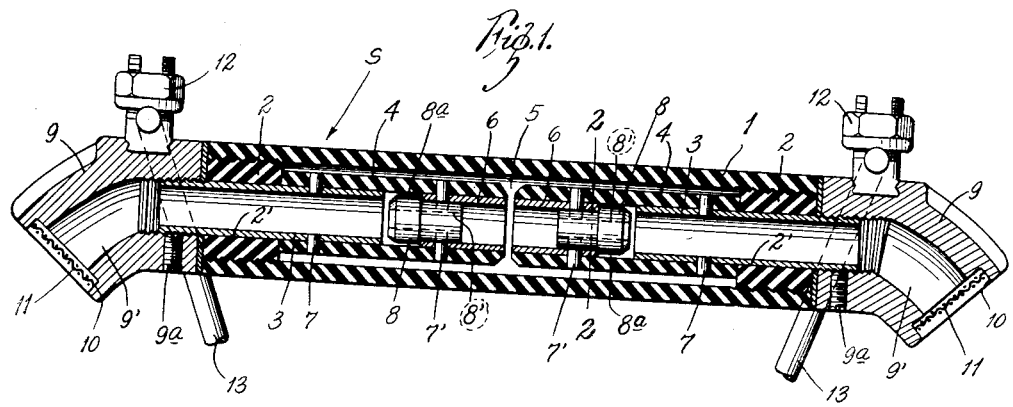
Fig. 1 is a longitudinal section of the improved surge device, parts of terminal conductors associated therewith being broken away.
Figure 2:
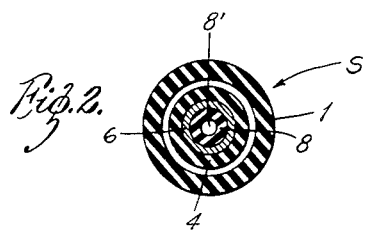
Fig. 2 is a cross-section taken on line 2—2 of Fig. 1.

In the drawing, wherein are shown for purposes of illustration, merely, two embodiments of the invention, S designates generally, in Figs. 1 and 2, the improved surge device illustrated therein. The surge device S comprises an outer tube 1 which preferably, though not necessarily, is formed of ceramic material which is characterized by being an insulator of electrical energy. At its opposite ends the outer tube 1 is internally screwthreaded, and screwed into these screwthreaded tube portions are members 2. The members 2 have formed therethrough, centrally thereof, openings 2' in which are disposed tubular elements 3 formed of suitable electrical conducting material, such as metal, said tubular elements being extended outwardly from the members 2 and inwardly with respect thereto into the outer tube 1 with a substantial space being present between the inner ends of the two tubular elements 3. Supported by the portions of the tubular elements 3 which extend inwardly of the members 2 is a pair of tubular members 4 whose outer ends abut against the inner faces of the members 2. The tubular members 4 are formed of horn fiber or other suitable materials which in the presence of the heat of an electric arc gives off gas which tends to extinguish the arc, and said tubular members are spaced apart at their adjacent, inner ends to provide a space that provides a gap 5, the function of which will be hereinafter set forth. The inner, adjacent portions of the tubular members 4 have disposed within the interiors thereof relatively short tubular elements 6, formed of electrical conducting material, whose inner ends are flush with the inner ends of the tubular members 4 and whose outer ends are spaced from the inner ends of the tubular elements 3, said tubular members 4 and said tubular elements 3 and 6 being secured together by pins 7 and 7'. Disposed partially within the tubular elements 6 are plugs 8 which are also formed of horn fiber characterized as explained above, said plugs having portions which are disposed within the tubular elements 6, and enlarged head portions which abut against the outer ends of said tubular elements 6 and whose peripheral faces are spaced only a slight distance from the portions of the inner faces of the tubular members 4 to provide restricted areas 8a. Also, the plugs 8 have openings 8' formed longitudinally therethrough from end to end thereof, and said plugs are secured in place relative to the tubular elements 6 by the pins 7' hereinbefore referred to.

The outer end portions of the tubular elements 3 are externally screwthreaded, as shown in Fig. 1, and screwthreadedly mounted on these screwthreaded portions are members 9 which are formed of electrical conducting material, said end members being of curved formation and having openings 9' formed therethrough, and being secured to said end portions of the tubular elements 3 by set screws 9a. The extreme outer end portions of the end members 9 are provided with recesses 10 which receive screens 11, said screens being intended to prevent entry of insects into the surge device S. The end members 9 have rigidly fixed thereto, in any suitable manner, connectors 12 which receive and mechanically and electrically engage conductor terminals 13 which are associated with the surge device.

In the normal use of the improved surge device S, illustrated in Figs. 1 and 2, the gap 5 of the surge device eliminates the possibility of surface leakage of current through said surge device, and thus keeps potential off of the surge device, said gap 5 being pre-set for a specific voltage to coordinate with the flash-over value of the equipment with which the surge device is associated. When, however, a surge comes on the line, due to lightning, for instance, the surge is by-passed around the protected equipment and through the surge device S, such by-pass path being provided by the end members 9, the tubular elements 3, and the tubular elements 6. The power-follow current, which accompanies such a surge, follows the same path, and as arcs are produced by such power-follow current leaping the gaps between the tubular elements 3 and the tubular elements 8, such arcs are drawn through the restricted areas 8a between the peripheral faces of the head portions of the plugs 8 and the adjacent inner face portions of the tubular members 4. The tubular members 4 and the plugs 8 are formed of horn fiber, and because the passage of the power arcs through the restricted areas referred to brings the arcs into intimate contact with the horn fiber of the tubular members 4 and the plugs 8, the heat of the arcs will cause the parts mentioned to give off a gas which aids in the extinguishment of the arcs. Also, because the surge device S, of Figs. 1 and 2, is open throughout its length and at its opposite ends, conducting gases will be quickly expelled from the interior of the surge device.

Figure 3:
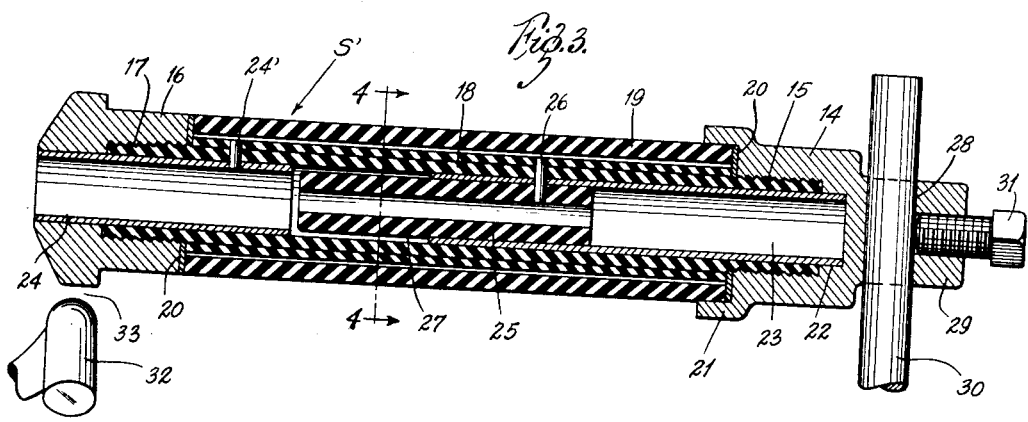
Fig. 3 is a longitudinal section of a modified form of the invention, with portions of terminal conductors associated therewith broken away.
Figure 4:
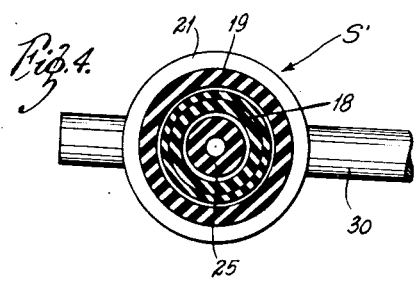
Fig. 4 is a cross-section taken on line 4—4 of Fig. 1, with an associated terminal conductor broken away.

In Figs. 3 and 4 a different form of surge device S' is illustrated, this type of surge device including an end member 14 which has a screwthreaded cavity 15 formed therein. At the opposite end of the surge device S' another end member 16 is arranged, and in this latter end member a screwthreaded cavity 17 is formed. Associated with the end members 14 and 16, and extended from one to the other thereof, is a tubular member 18 which is formed of horn fiber and is provided with externally screwthreaded portions at its opposite ends that are screwthreadedly disposed in the cavities 15 and 17 of said end members. Also, the surge device S' includes an outer tube 19 formed from suitable insulating material, such, for instance, as a ceramic material, said outer tube contacting at its opposite ends with gaskets 20 which are interposed between said opposite ends of said outer tube and adjacent faces of the end members 14 and 16. The end member 14 is provided with a flange portion 21 which embraces an end portion of the outer tube 19, and the tubular member 18 is provided with annular shoulders which abut against the gaskets 20. Seated in a recess 22 formed in the end member 14 is a tubular element 23 formed of electrical conducting matement, said tubular element being extended longitudinally of the tubular member 18 a substantial distance, and supported in a centrally located opening formed in the end member 16, and secured to the tubular member 18 by a pin 26', is a similar tubular element 24 which is likewise is formed of electrical conducting material. The tubular elements 23 and 24 are spaced apart at their inner ends and the tubular element 23 supports an inner tubular member 25, formed of horn-fiber, which is disposed partially within said tubular element 23 and extends outwardly therefrom toward the inner end of the tubular element 24. The inner tubular member 25 is secured to the tubular element 23, and to the tubular member 18, by a pin 26, and a restricted area 27 is provided between a portion of the outer face of said inner tubular member 25 and a portion of the inner face of the tubular member 18, which restricted area is located between the inner ends of the tubular elements 23 and 24.

The end member 16 closes the surge device S' at the end thereof at which it is located and an opening 28 is formed through an extension 29 of said end member 14 through which a portion of terminal conductor 30 is extended, the surge device and the terminal conductor 30 being secured together by a set screw 31 which is associated with the end member 14. The end of the surge device, at which the end member 16 is located, is open, and this end member 16 is spaced from a portion of a conducting element 32 that is suitably supported, such spacing of the end member from a portion of the element 32 providing a gap 33.

The surge device S' illustrated in Figs. 3 and 4 functions just as does the surge device S shown in Figs. 1 and 2. In other words, the gap 33 eliminates surface leakage of current through the device and thereby keeps potential off of the surge device under normal working conditions. However, when a surge comes on the line, said surge is by-passed around the equipment with which the surge device is associated and through the surge device, and passage of power-follow current through the surge device produces an arc between the inner ends of the tubular elements 23 and 24. This arc is drawn through the restricted area 27 and its heat causes the horn fiber of the tubular members 18 and 25 to give off gas which aids in the extinguishment of the arc. Because the surge device S' is open at an end thereof conducting gases produced within said surge device are quickly expelled therefrom through said open end.

I claim:

1. An electrical surge device including an outer tube formed of electrical insulating material, a plurality of tubular conducting elements disposed in alined relation within said outer tube in such manner that a pair of gaps are provided between ends of adjacent tubular conducting elements over which arcs are formed by power follow current accompanying a surge by-passed by the surge device and so that a space is provided between ends of adjacent tubular conducting elements which serves to keep potential off of the surge device by preventing surface leakage of current through the surge device, a pair of alined inner tubes disposed within said outer tube each in embracing relation with respect to a pair of adjacent tubular conducting elements and with respect to the gap therebetween, said inner tubes being spaced apart at their inner adjacent ends at the location of said space between ends of adjacent tubular conducting elements, and tubular members disposed partially within certain of said tubular conducting elements and projected therefrom at the locations of said gaps, surface portions of said tubular members being spaced apart slightly from adjacent portions of the faces of the bores of said inner tubes to provide restricted areas therebetween and within said gaps through which arcs formed across said gaps are adapted to extend, said inner tubes and said tubular members being formed of electrical insulating material which gives off gas in the presence of the heat of an electrical arc that aids in the extinguishment of the arc, said tubular conducting elements and said tubular members being so related that the bores thereof provide an elongated opening which is extended longitudinally of the surge device and communicates with said restricted areas through which elongated opening gas produced within the surge device is vented.

2. An electrical surge device including an outer tube formed of electrical insulating material, a plurality of tubular conducting elements disposed in alined relation within said outer tube in such manner that a pair of gaps are provided between ends of adjacent tubular conducting elements over which arcs are formed by power follow current accompanying a surge by-passed by the surge device and so that a space is provided between ends of adjacent tubular conducting elements which serves to keep potential off of the surge device by preventing surface leakage of current through the surge device, a pair of alined inner tubes disposed within said outer tube each in embracing relation with respect to a pair of adjacent tubular conducting elements and with respect to the gap therebetween, said inner tubes being spaced apart at their inner adjacent ends at the location of said space between ends of adjacent tubular conducting elements, and tubular members disposed partially within certain of said tubular conducting elements and projected therefrom in opposite directions at the locations of said gaps and with one of said plurality of tubular conducting elements disposed between each tubular member and the end of the surge device toward which said tubular member is extended, surface portions of said tubular members being spaced apart slightly from adjacent portions of the faces of the bores of said inner tubes to provide restricted areas therebetween and within said gaps through which arcs formed across said gaps are adapted to extend, said inner tubes and said tubular members being formed of electrical insulating material which gives off gas in the presence of the heat of an electrical arc that aids in the extinguishment of the arc, said tubular conducting elements and said tubular members being so related that the bores thereof provide an elongated opening which is extended longitudinally of the surge device and is open at the opposite ends of the surge device and communicates with said restricted areas through which elongated opening gas produced within the surge device is vented.

GEORGE W. GOLDNER.